(12) United States Patent
Taniguchi

(10) Patent No.: US 9,058,148 B2
(45) Date of Patent: Jun. 16, 2015

(54) COMMUNICATION APPARATUS, CONTROL METHOD THEREFOR, AND STORAGE MEDIUM

(71) Applicant: CANON KABUSHIKI KAISHA, Tokyo (JP)

(72) Inventor: Manabu Taniguchi, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 13/725,464

(22) Filed: Dec. 21, 2012

(65) Prior Publication Data
US 2013/0163051 A1 Jun. 27, 2013

(30) Foreign Application Priority Data

Dec. 27, 2011 (JP) ................................. 2011-286777

(51) Int. Cl.
| | |
|---|---|
| *H04N 5/76* | (2006.01) |
| *G06F 3/12* | (2006.01) |
| *H04N 21/426* | (2011.01) |
| *H04N 21/432* | (2011.01) |
| *H04N 21/436* | (2011.01) |
| *H04N 21/442* | (2011.01) |
| *H04N 21/488* | (2011.01) |
| *H04L 29/08* | (2006.01) |

(52) U.S. Cl.
CPC ........ *G06F 3/1296* (2013.01); *H04N 21/42646* (2013.01); *H04N 21/4325* (2013.01); *H04N 21/43615* (2013.01); *H04N 21/44231* (2013.01); *H04N 21/4882* (2013.01); *H04L 67/06* (2013.01); *H04L 67/12* (2013.01)

(58) Field of Classification Search
USPC ........ 348/231.7–231.9, 211.99, 211.1, 211.2, 348/211.3, 211.4, 207.1, 372
See application file for complete search history.

(56) References Cited

U.S. PATENT DOCUMENTS

| | | | |
|---|---|---|---|
| 7,139,021 B2 * | 11/2006 | Mizutani | .................... 348/231.9 |
| 7,610,349 B1 | 10/2009 | Swinton | |
| 2003/0048361 A1 | 3/2003 | Safai | |
| 2003/0185547 A1 | 10/2003 | Kikuchi | |
| 2005/0094001 A1 | 5/2005 | Saga | |
| 2006/0044470 A1 * | 3/2006 | Koike | ........................... 348/552 |
| 2010/0197348 A1 * | 8/2010 | Kojima | ........................ 455/558 |

FOREIGN PATENT DOCUMENTS

| | | |
|---|---|---|
| CN | 101017451 A | 8/2007 |
| CN | 101882117 A | 11/2010 |
| JP | 2010118741 A | 5/2010 |
| WO | 02/056202 A | 7/2002 |

* cited by examiner

*Primary Examiner* — Yogesh Aggarwal
(74) *Attorney, Agent, or Firm* — Canon U.S.A., Inc., IP Division

(57) ABSTRACT

A communication apparatus configured to communicate with an external apparatus includes a recording unit configured to record content data on a removable recording medium, a transmission unit configured to transmit the content data to the external apparatus, a selection unit configured to select a mode from among a plurality of modes including a setting mode and a transmission mode, a determination unit configured to determine whether the removable recording medium is in an attachable and detachable state, and a control unit configured to control communication with the external apparatus, wherein, in a case where the selected mode is the setting mode when it is determined by the determination unit that the removable recording medium is in the attachable and detachable state, the control unit does not stop communication with the external apparatus.

18 Claims, 12 Drawing Sheets

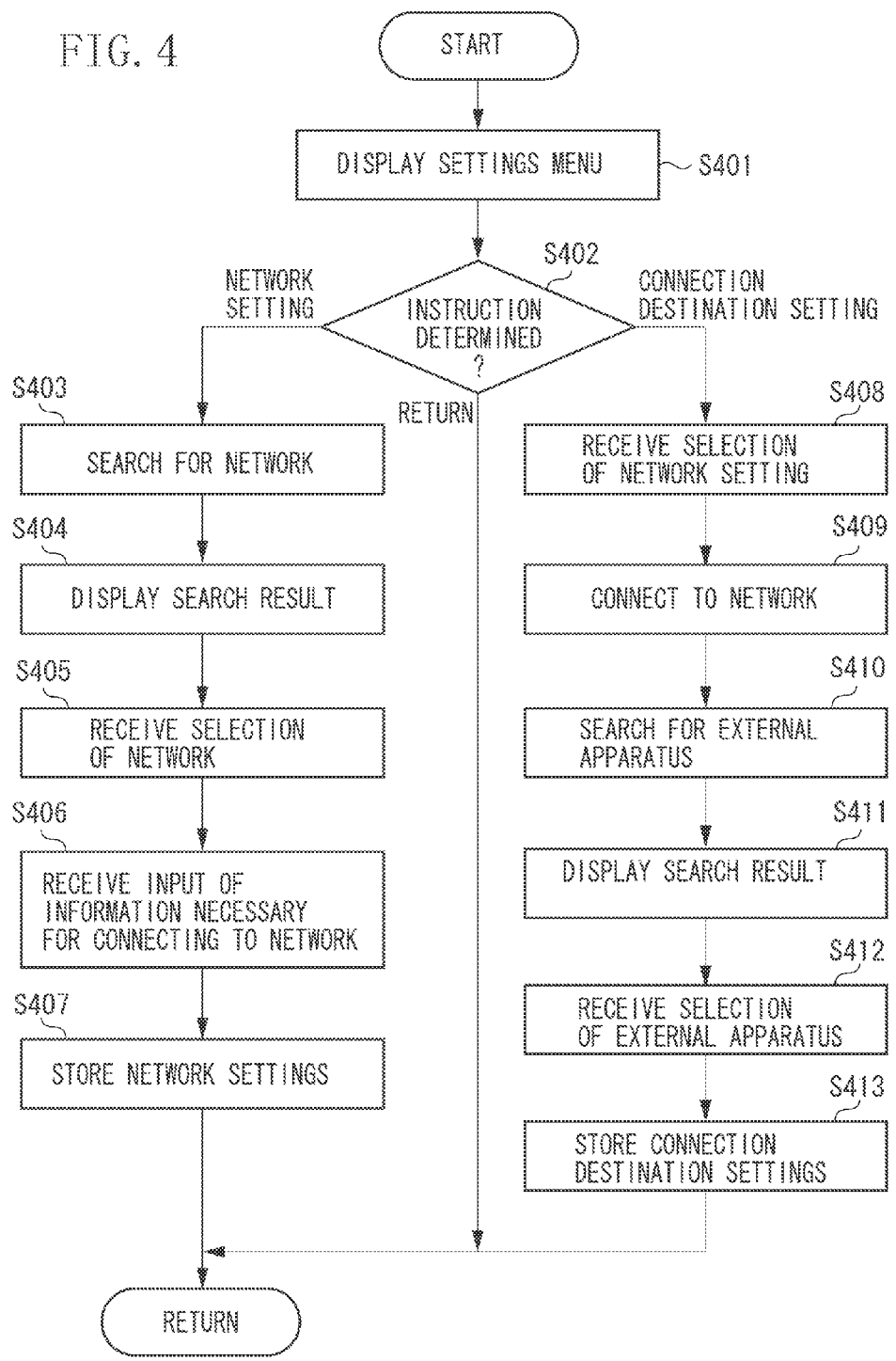

FIG. 9

```
┌─────────────────────────────────────────┐
│             CONTENT LIST                │
│ ─────────────────────────────────────── │
│  ┌───────────────────────────────────┐  │
│  │  • IMG_0001. jpg                  │  │
│  │  • IMG_0002. jpg                  │  │
│  │  × IMG_0003. jpg                  │  │
│  │  × IMG_0004. jpg                  │  │
│  │  × IMG_0005. jpg                  │  │
│  │  × IMG_0006. jpg                  │  │
│  │                                   │  │
│  └───────────────────────────────────┘  │
└─────────────────────────────────────────┘
```

COMMUNICATION APPARATUS, CONTROL METHOD THEREFOR, AND STORAGE MEDIUM

BACKGROUND OF THE INVENTION

1. Field of the Invention

The present invention relates to a communication apparatus, a control method therefor, and a storage medium.

2. Description of the Related Art

Conventionally, a communication apparatus capable of establishing connection to an external apparatus for exchange of data therewith is known. Such a communication apparatus can read image data recorded on a removable recording medium (an attachable/detachable recording medium), and transmit the image data to the external apparatus. When the recording medium is removed during transmission of the image data, there is a possibility that the image data fails to be read, and damage of the recording medium or a communication error may occur. To prevent this, a cover is provided to cover the recording medium so that it cannot be detached, and it is expected that communication with the external apparatus ends automatically when the cover is opened and the recording medium becomes detachable. However, in a case where communication with the external apparatus is wirelessly performed, settings of a network and acquisition of information necessary in connecting to the external apparatus are needed before transmission/reception of data is actually performed. These processing operations necessitate communication with an access point or an external apparatus, while it would appear that there is often no need to gain access to the recording medium. That is, it would appear that possibility for occurrence of inconveniences by removal of the recording medium is relatively low. It is not efficient to end communication even in such cases.

SUMMARY OF THE INVENTION

According to an aspect of the present invention, a communication apparatus configured to communicate with an external apparatus includes a recording unit configured to record content data on a removable recording medium, a transmission unit configured to transmit the content data to the external apparatus, a selection unit configured to select a mode from among a plurality of modes including a setting mode for acquiring information necessary for transmitting the content data to the external apparatus by communicating with the external apparatus, and storing the information on an unremovable recording medium other than the removable recording medium, and a transmission mode for communicating with the external apparatus using the information stored in the setting mode, and transmitting content data read from the removable recording medium to the external apparatus, a determination unit configured to determine whether the removable recording medium is in an attachable and detachable state, and a control unit configured to control communication with the external apparatus, wherein, in a case where the selected mode is the transmission mode when it is determined by the determination unit that the removable recording medium is in the attachable and detachable state, the control unit stops communication with the external apparatus, and in a case where the selected mode is the setting mode when it is determined by the determination unit that the removable recording medium is in the attachable and detachable state, the control unit does not stop communication with the external apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart illustrating an operation of the communication apparatus in setting processing according to the first exemplary embodiment.

FIG. 9 illustrates an example of a screen displayed in processing by an external apparatus corresponding to the server processing of the communication apparatus according to the first exemplary embodiment.

DESCRIPTION OF THE EMBODIMENTS

Various exemplary embodiments, features, and aspects of the invention will be described in detail below with reference to the drawings.

Figure 1:
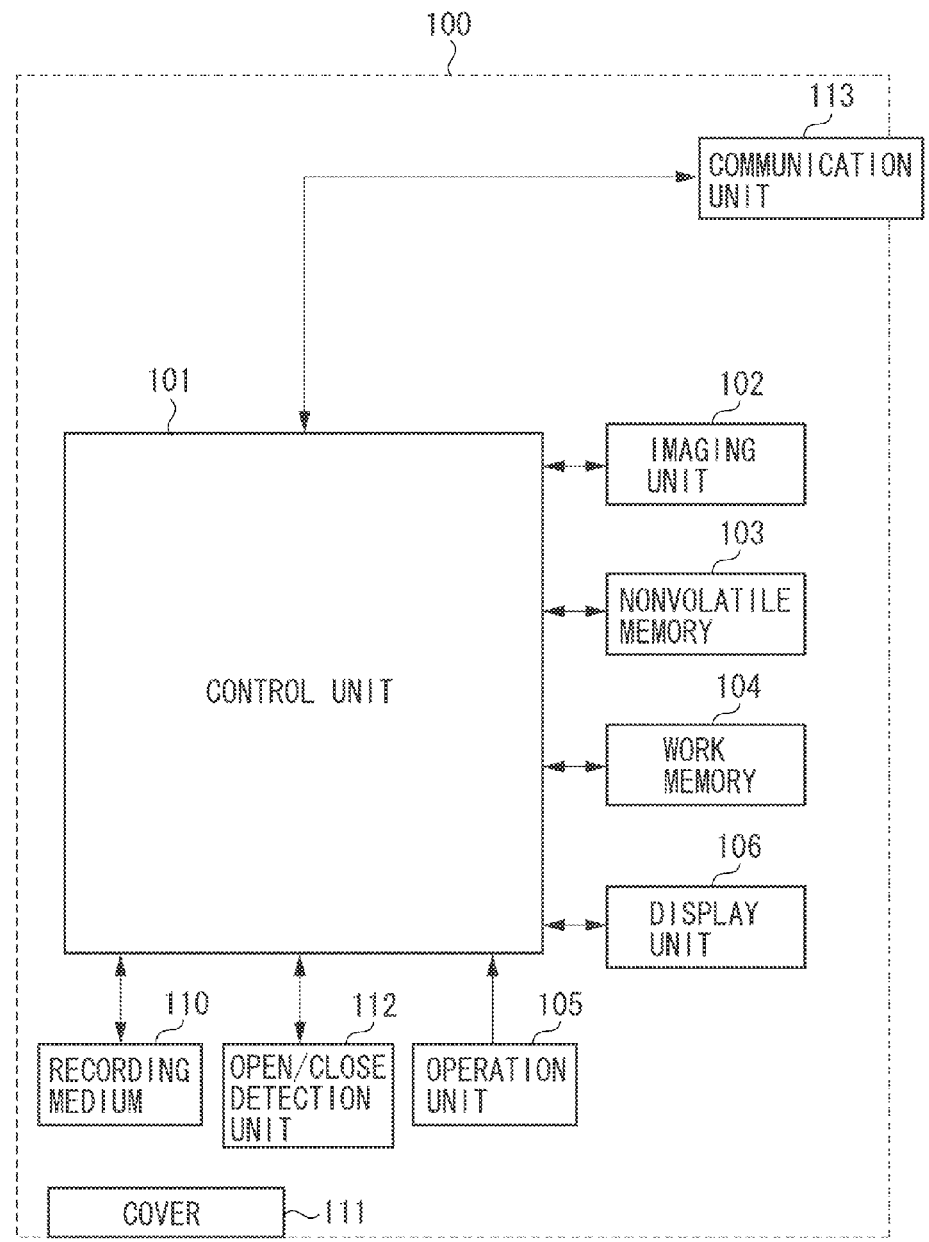
FIG. 1 is a block diagram illustrating an example of configuration of a communication apparatus according to a first exemplary embodiment.

FIG. 1 illustrates a configuration of a digital camera 100, which is an example of a communication apparatus according to a first exemplary embodiment. The digital camera as an example of the communication apparatus will be described below, but the communication apparatus is not limited to this. For example, the communication apparatus may be a personal computer, or a mobile phone, what is called a tablet device.

A control unit 101 controls respective units of the digital camera 100 according to an input signal or a program described below. Instead of controlling the entire apparatus by the control unit 101, the entire apparatus may be controlled by sharing the processing by a plurality of pieces of hardware. Further, the digital camera 100 in the present exemplary embodiment has at least a communication mode. The communication mode is a mode for performing exchange of data with an external apparatus via a communication unit 113 described below. An operation of the digital camera 100 in the communication mode will be described below.

An imaging unit 102 converts an object image which has been formed by a lens included in the imaging unit 102 into an electric signal, and outputs digital data as image data after performing noise reduction processing. The captured image data is finally recorded on a recording medium 110.

A nonvolatile memory 103 is an electrically erasable/recordable nonvolatile memory, and stores therein programs described below executed by the control unit 101. The nonvolatile memory 103 is configured to be unattachable and undetachable from the digital camera 100, unlike the recording medium 110 described below.

A work memory 104 is used as a buffer memory that temporarily holds the image data captured by the imaging unit 102, or as an image display memory of a display unit 106, or as a work area for the control unit 101.

An operation unit 105 is used to receive from a user an instruction given to the digital camera 100. The operation unit 105 is configured to include operation members such as, for example, a power source button for the user to instruct power-on/-off of the digital camera 100, a release switch to instruct a shooting operation, and a reproduction button to instruct reproduction of the image data. Also, a touch panel (a touch screen) formed on the display unit 106 described below is included in the operation unit 105.

The display unit 106 performs display of a viewfinder image at the time of shooting, display of the shot image data, and character display for an interactive operation. The display unit 106 is not necessarily provided by the digital camera 100, but the digital camera 100 only needs at least to be able to connect to the display unit 106, and have a display control function for controlling display on the display unit 106.

The recording medium 110 can record the image data output from the imaging unit 102. Further, the image data recorded on the recording medium 110 can be readout on the work memory 104, can be displayed on the display unit 106, and can be transmitted to the external apparatus via the communication unit 113 described below. Hereinbelow, recording of data on the recording medium 110 or reading of data from the recording medium 11 are collectively-referred to as "access to the recording medium 110". Further, the recording medium 110 is attachable or detachable to or from the digital camera 100.

A cover 111 is an openable/closable cover member for covering the recording medium 110 attached to the digital camera 100. While the cover 111 is closed, the recording medium 110 is covered with the cover 111, and cannot be detached. Further, while the cover 111 is opened, the recording medium 110 can be attached or detached.

An open/close detection unit 112 is a device for detecting opening and closing of the cover 111. The control unit 101 can determine opening and closing of the cover 111 by detecting an ON/OFF state of the open/close detection unit 112. The open/close detection unit 112 may be any device as long as it can detect opening and closing of the cover 111. For example, a physical switch using a general protruding member, or an electric contact can be used. The open/close detection unit 112 is configured to be powered on, by the cover 111 coming into an opened state. The control unit 101 determines that the cover 111 has come into the opened state, by power-on of the open/close detection unit 112. In other words, by the power-on of the open/close detection unit 112, the control unit 101 determines that the recording medium 110 has come into an attachable and detachable state, and vice versa.

The communication unit 113 is an interface for communicating with the external apparatus. The digital camera 100 can transmit/receive data to/from the external apparatus via the communication unit 113. In the present exemplary embodiment, the communication unit 113 serves as an antenna, and the control unit 101 can perform wireless communication with the external apparatus, via the antenna. As a wireless communication scheme, for example, a wireless local area network (LAN) or a Bluetooth (registered trademark) may be used.

The configuration of the external apparatus is similar to that of the digital camera 100, and, therefore, redundant descriptions thereof will be avoided. In the present exemplary embodiment, the external apparatus will be described as a personal computer (PC). The external apparatus is not limited to the PC. For example, the external apparatus may be another digital camera, or a mobile phone. Alternatively, what is called a tablet device or a printer, a web server may be used.

As described above, the digital camera 100 is connected to the external apparatus to perform communication therewith. The digital camera 100 comes into the communication mode when communicating with the external apparatus. In that mode, the digital camera 100 can transmit the image data recorded on the recording medium 110 to the external apparatus. Hereinbelow, an operation of the digital camera 100 in the communication mode will be described below.

Figure 2:
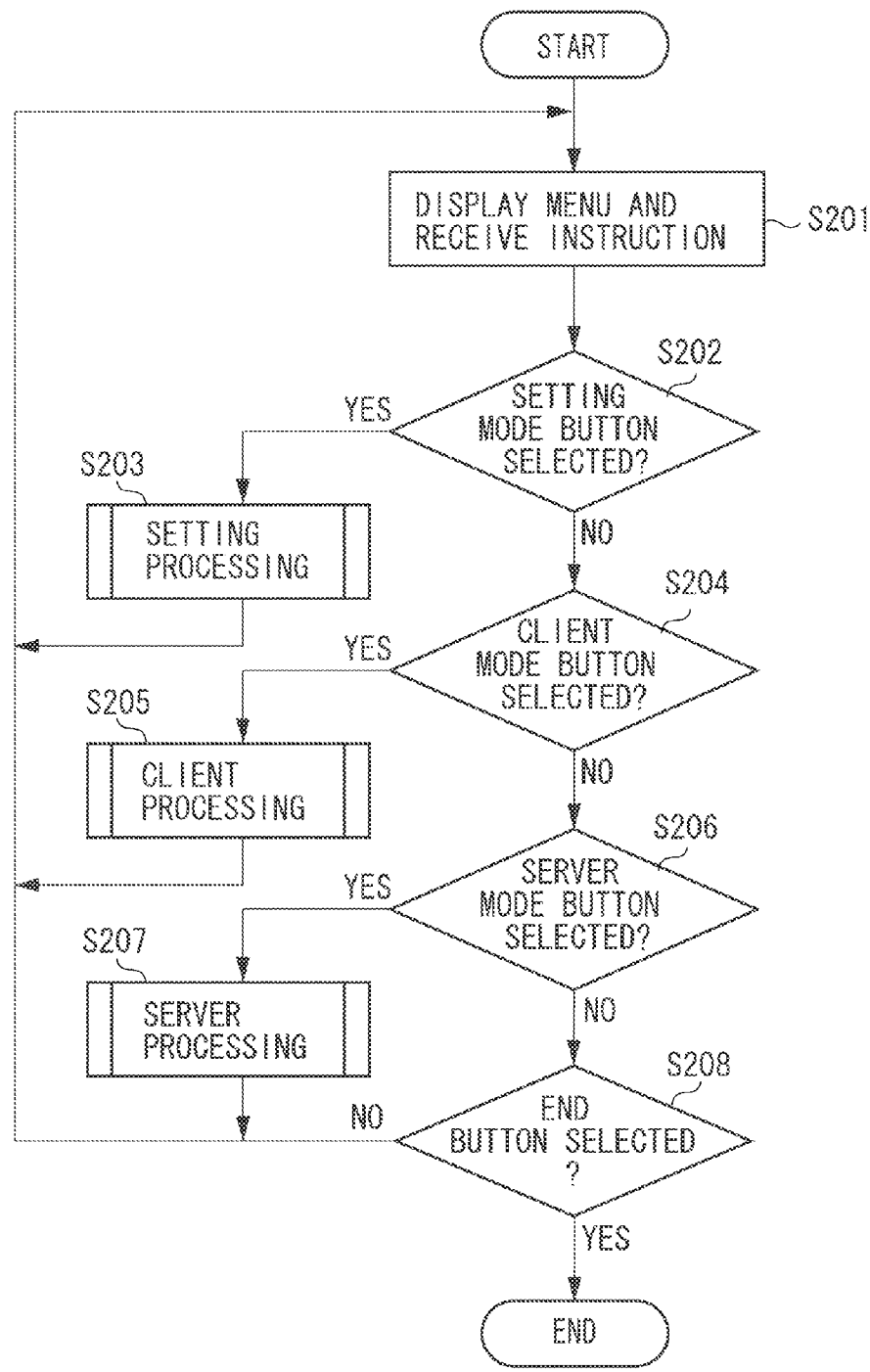
FIG. 2 is a flowchart illustrating an operation of the communication apparatus in a communication mode according to the first exemplary embodiment.

FIG. 2 is a flowchart illustrating the processing executed by the digital camera 100 operating in the communication mode. Each processing illustrated in the flowchart is realized by the control unit 101 in the digital camera 100, which executes a program recorded on the nonvolatile memory 103, and controls respective parts in the digital camera 100 according to the program. Each processing illustrated in the flowcharts beyond this will be similarly realized. Further, the processing illustrated in the flowchart will be started according to the fact that, for example, an instruction for shifting to the communication mode has been received via a menu operation.

Figure 3:
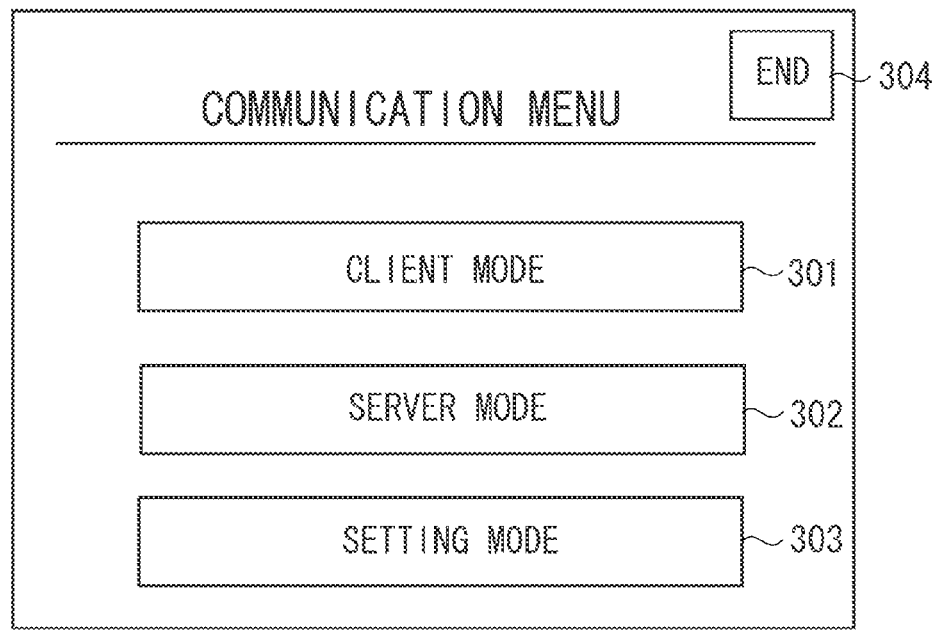
FIG. 3 is an example of a menu display screen in the communication mode according to the first exemplary embodiment.

First, in step S201, the control unit 101 displays a menu screen as illustrated in FIG. 3 on the display unit 106, and receives an instruction from the user. In the present exemplary embodiment, the screen in FIG. 3 is an example of a top menu screen, which becomes a starting point of the communication mode. By selecting a displayed button via the operation unit 105, the user can cause the digital camera 100 to shift to a mode corresponding to the button.

An outline of each mode will be described.

In the present exemplary embodiment, different processing operations are performed between a transmission mode which is a mode for transmitting the image data to the external apparatus, and a setting mode different from the transmission mode. In the present exemplary embodiment, as an example of the transmission mode, two types of a client mode and a server mode are prepared.

In the client mode, client processing is executed. The client processing is processing for transmitting the image data recorded on the recording medium 110 from the digital camera 100 to the external apparatus according to the user's instruction of the digital camera 100. In the present exemplary embodiment, for example, the digital camera 100 performs the client processing using functions of a file transfer protocol (FTP) client.

In the server mode, server processing is executed. The server processing is processing for receiving from the external apparatus an instruction to transmit the image data recorded on the recording medium 110 to the external apparatus. The user of the external apparatus can view the image data recorded on the recording medium 110 in the digital camera 100, via the external apparatus, and can make a request for desired image data to the digital camera 100. In the present exemplary embodiment, the digital camera 100 performs the server processing in accordance with guidelines of, for example, Digital Living Network Alliance. In that case, the digital camera 100 operates as a digital media server, and the external apparatus operates as a digital media player.

Further, the digital camera 100 has a setting mode in addition to the client mode and the server mode. In the setting mode, setting processing is executed. The setting processing is processing for setting information necessary for establishing communication with the external apparatus. In the digital camera 100 according to the present exemplary embodiment, the setting processing is performed in advance of the client processing or the server processing. Accordingly, information for establishing communication with the external apparatus can be preset. In the client processing or the server processing, communication with the external apparatus is established using the information set through the setting processing. By presetting the information for establishing communication in this way, time and effort can be saved for inputting the information for establishing communication with the same external apparatus, each time the client processing or the server processing is performed.

The above descriptions are the outlines of respective processing. In the example in FIG. 3, a client mode button 301, a server mode button 302, and a setting mode button 303 are displayed. The client mode button 301 is a button for receiving an instruction to shift to the client mode and to execute the client processing. The server mode button 302 is a button for receiving an instruction to shift to the server mode and to execute the server processing. The setting mode button 303 is a button for receiving an instruction to shift to the setting mode and to execute the setting processing. Further, on an upper-right of the screen, an end button 304 for receiving an instruction to end the communication is displayed together. The user, by selecting one of these buttons via the operation unit 105, can input an instruction corresponding to the button.

Next, in steps S202, S204, S206, and S208, the control unit 101 determines which button has been selected in step S201. In other words, the control unit 101 determines which instruction corresponds to the instruction received in step S201. These processing operations are executed in parallel with the processing in step S201. In step S202, if the control unit 101 determines that the setting mode button 303 has been selected (YES in steps S202), the processing proceeds to the setting processing in step S203. In step S204, if the control unit 101 determines that the client mode button 301 has been selected (YES in steps S204), the processing proceeds to the client processing in step S205. Then, in step S206, if the control unit 101 determines that the server mode button 302 has been selected (YES in steps S206), the processing proceeds to the server processing in step S207. Then, in step S208, if the control unit 101 determines that the end button 304 has been selected (YES in steps S208), the processing in the flowchart ends. Otherwise (NO in steps S208), the processing returns to step S201, and the control unit 101 waits for an instruction from the user.

Hereinbelow, operations of the digital camera 100 in respective processing will be described.

First, the setting processing will be described. As described above, the setting processing is processing for presetting information to be used for establishing communication with the external apparatus. In the present exemplary embodiment, an example in which the digital camera 100 and the external apparatus are connected in what is called infrastructure mode via the access point will be described.

FIG. 4 is a flowchart of the setting processing executed by the digital camera 100. The processing illustrated in the flowchart is executed in step S203 in FIG. 2. That is, the processing illustrated in the flowchart is started by the control unit 101 determining that an instruction to shift to the setting processing has been received in step S201.

Figure 5A:
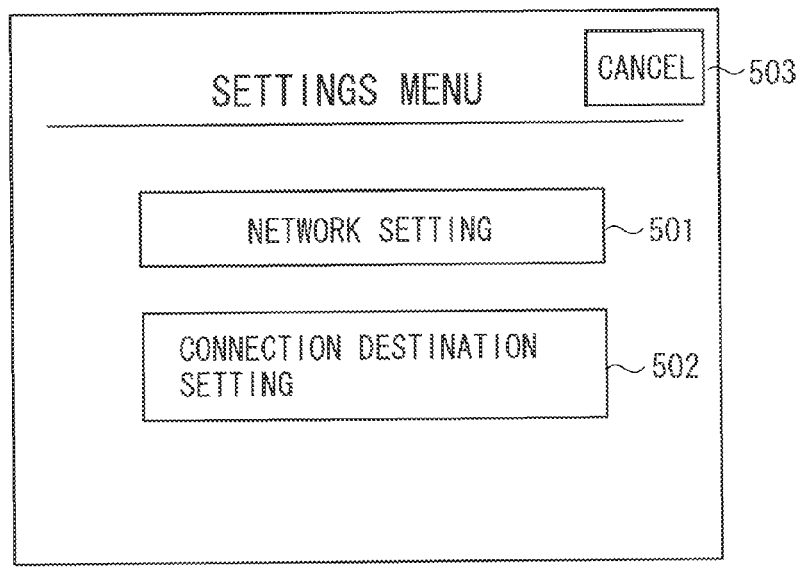
FIGS. 5A, 5B, 5C, and 5D illustrate examples of a display screen in the setting processing according to the first exemplary embodiment.

First, in step S401, the control unit 101 displays a menu screen as illustrated in FIG. 5A on the display unit 106, and receives an instruction from the user. In the example in FIG. 5A, a network setting button 501 and a connection destination setting button 502 are displayed. The network setting button 501 is a button for receiving an instruction to set a network for communicating with the external apparatus. The connection destination setting button 502 is a button for receiving an instruction to set the external apparatus as a communication partner. Further, on upper-right of the screen, a cancel button 503 for receiving an instruction to return to the top menu screen is displayed together. The user can select these buttons via the operation unit 105.

Next, in step S402, the control unit 101 determines an instruction that has been received in step S401.

First, a case where the control unit 101 determines that the network setting button 501 has been selected will be described below (NETWORK SETTING in step S402). In that case, the processing proceeds to step S403.

In step S403, the control unit 101 detects networks which the access point generates. Specifically, the networks are detected by receiving beacon signals transmitted from the access point.

Figure 5B:
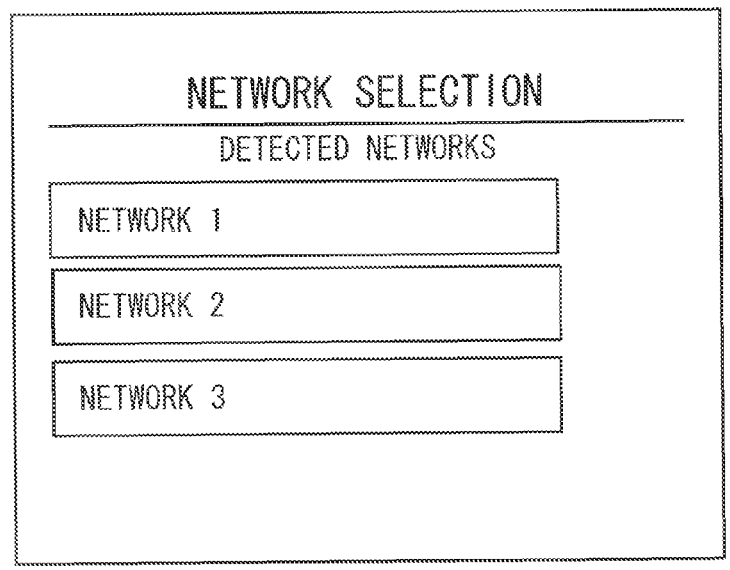

Then in step S404, the control unit 101 lists up the networks detected in step S403 and displays them on the display unit 106. For example, a screen as illustrated in FIG. 5B is displayed. In that example, three networks are detected, and SSIDs of respective networks are displayed. A beacon signal includes information necessary for participating in a network (e.g., a service set identifier (hereinafter, SSID) which is an identifier of a network, an authentication method, an encryption method). In the present exemplary embodiment, of information included in the beacon signal, an SSID of the network is displayed so that the user can identify each network.

Next, in step S405, the control unit 101 receives, via the operation unit 105, a selection of the network displayed on the display unit 106.

Next, in step S406, the control unit 101 receives an input of information necessary for participating in the network selected in step S405. The control unit 101 receives, for example, an input of an encryption key or a selection of acquisition method of IP address, via the operation unit 105.

Finally, in step S407, the control unit 101 collectively holds on the nonvolatile memory 103 the information included in the beacon signal of the selected network, and the information received in step S406 as network settings. By repeating the processing in steps S403 through S407, a plurality of network settings can be held. When the processing in the step ends, the processing in the flowchart ends, and returns to step S201 in FIG. 2.

The above operations are the processing in a case where the control unit 101 determines that the network setting button 501 has been selected in step S402. Next, in step S402, a case where the control unit 101 determines that the connection destination setting button 502 has been selected will be described below (CONNECTION DESTINATION SETTING in step S402). In that case, the processing proceeds to step S408.

Figure 5C:
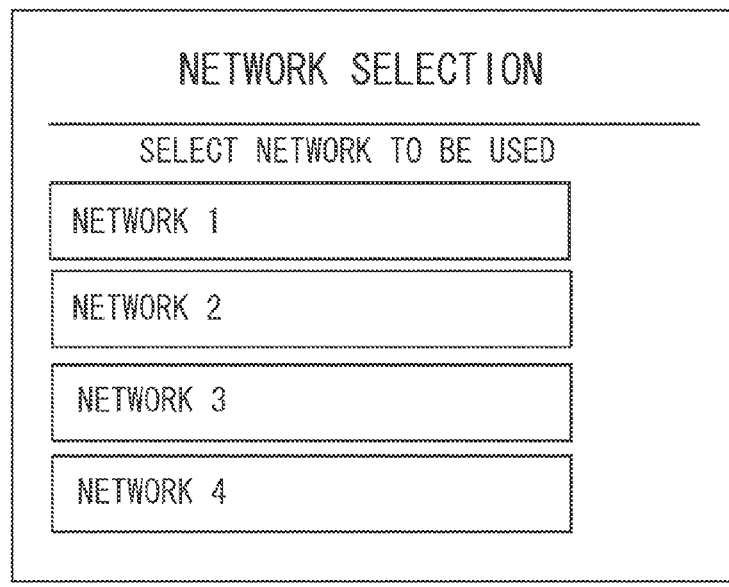

In step S408, the control unit 101 displays a screen as illustrated in FIG. 5C on the display unit 106, and receives an instruction from the user. In the example in FIG. 5C, the network settings held on the nonvolatile memory 103 in the processing in step S407 are displayed. In FIG. 5C, an example in which four network settings are held is illustrated. In conjunction with this, a message "Select a network to be used" is displayed. This prompts the user to select a network of the access point to be used. The user can input an instruction to select a network to be used, via the operation unit 105.

Next, in step S409, the control unit 101 participates in the network, using the selected network setting.

Subsequently, in step S410, the control unit 101 searches for other devices that participate in the same network.

Figure 5D:
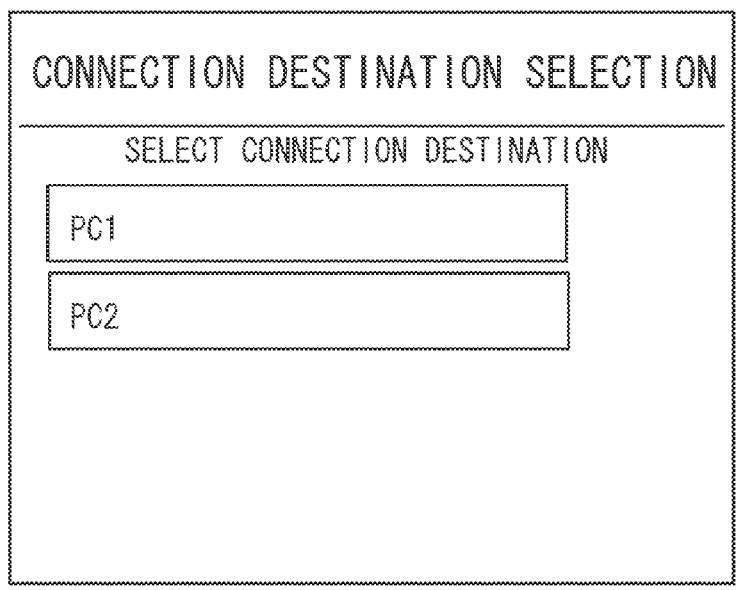

Next, in step S411, the control unit 101 displays a result searched in step S410 on the display unit 106. For example, a screen as illustrated in FIG. 5D is displayed. In this process, names of other devices that participate in the networks are listed. The user can select a name of the device determined as the external apparatus of communication partner via the operation unit 105, from among the names of these devices.

In step S412, the control unit 101 receives selection of the name of the device displayed on the display unit 106, via the operation unit 105.

Finally, in step S413, the control unit 101 stores, on the nonvolatile memory 103, information necessary for connecting with the device selected in step S412, as connection destination setting. The information stored in this case is information about the external apparatus, received when the external apparatus has been searched in step S410. For example, a universally unique identifier (UUID) or the like indicating a unique value for each device is stored. In the setting of connection destination, a plurality of settings is not stored unlike the settings of a network. When the processing in step S413 ends, the processing in the flowchart ends, and returns to step S201 in FIG. 2.

The above operations are the processing of the case where the control unit 101 determines that the connection destination setting button 502 has been selected in step S402.

Finally, the case where the control unit 101 determines that the cancel button 503 has been selected in step S402 will be described below (RETURN in step S402). In that case, the processing in the flowchart ends, and returns to step S201 in FIG. 2.

The above operations are the setting processing executed in step S203 in FIG. 2. The network setting held in the setting processing or the connection destination setting is used in the client processing or the server processing described below. By thus presetting the network to be used or the information of the external apparatus to be connected, time and effort such as selecting a network to be used from among the networks detected every time or inputting the encryption key can be saved, when communication with the external apparatus is established.

Next, the client processing will be described below. In the client processing, processing for transmitting the image data is executed by establishing communication with the external apparatus using the information set in the above-described setting processing. The processing is performed mainly by the digital camera 100, which reads image data from the recording medium 110, and transmits it to the external apparatus.

Figure 6:
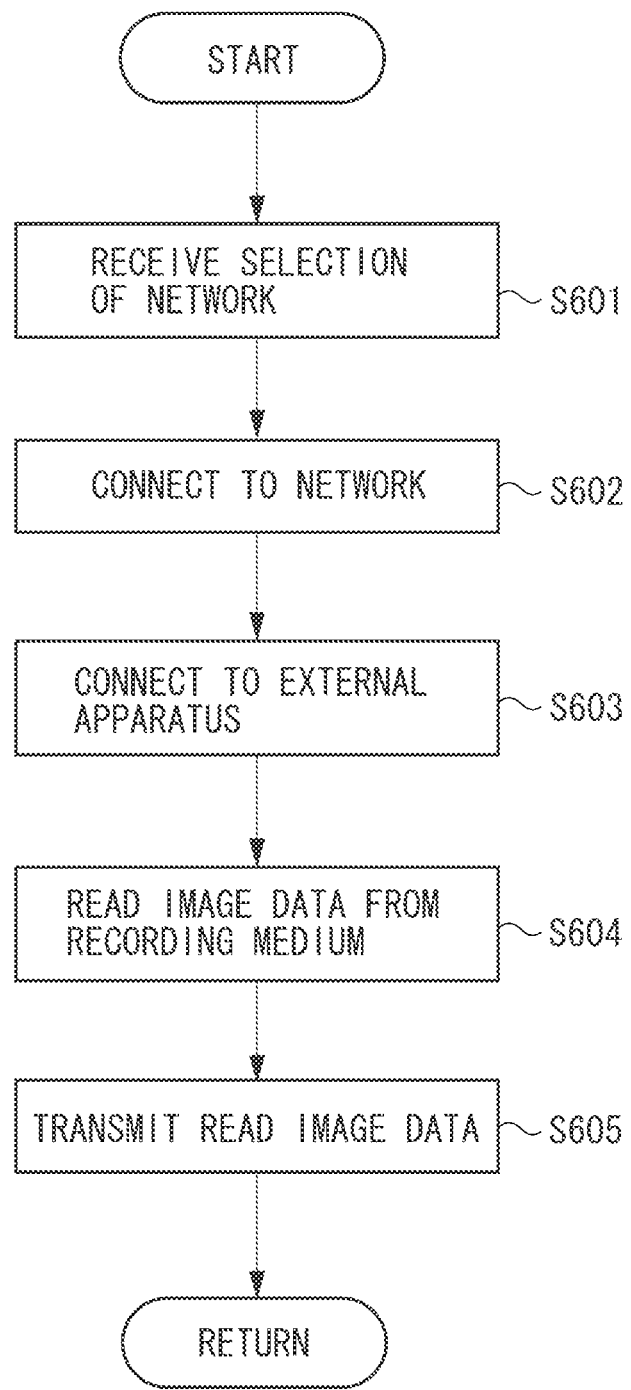
FIG. 6 is a flowchart illustrating an operation of the communication apparatus in client processing according to the first exemplary embodiment.

FIG. 6 is a flowchart of the client processing executed by the digital camera 100. The processing illustrated in the flowchart is executed in step S205 in FIG. 2. That is, the processing illustrated in the flowchart is started by the control unit 101 determining that an instruction to shift to the client processing in step S201 has been received.

First, in step S601, the control unit 101 receives selection of a network. The processing is similar to the processing in step S408.

Next, in step S602, the control unit 101 connects to the selected network, using the network settings stored in step S407 in FIG. 4. The processing is similar to the processing in step S409.

Subsequently, in step S603, the control unit 101 establishes communication with the external apparatus, using the connection destination setting stored in advance in step S413 in FIG. 4.

Next, in step S604, the control unit 101 reads image data from the recording medium 110 on the work memory 104.

Then, in step S605, the control unit 101 transmits the image data read in step S604, to the external apparatus with which communication has been established.

The image data read and transmitted in steps S604 and S605 may be all of the image data recorded on the recording medium 110, or may be only not-yet-transmitted image data. Alternatively, it may be configured such that selection can be made between transmission of all the image data and transmission of only the not-yet-transmitted image data. In that case, for example, before receiving the selection of the network in step S601, selection between transmission of all the image data and transmission of only the not-yet-transmitted image data maybe received. Further, there is a limit to image data caused to read at one time, in view of a capacity of the work memory 104. Therefore, depending on the number of pieces of image data to be transmitted, the processing in steps S604 and S605 will be repeated.

When the image data to be transmitted has been all transmitted, the processing in the present flowchart ends, and returns to the processing in FIG. 2.

The above operations are the client processing executed in step S205 in FIG. 2.

Next, the server processing will be described below. In the server processing, processing for receiving from the external apparatus an instruction to transmit the image data is executed. In the processing, the control unit 101 transmits the image data according to the instruction from the external apparatus.

Figure 7:
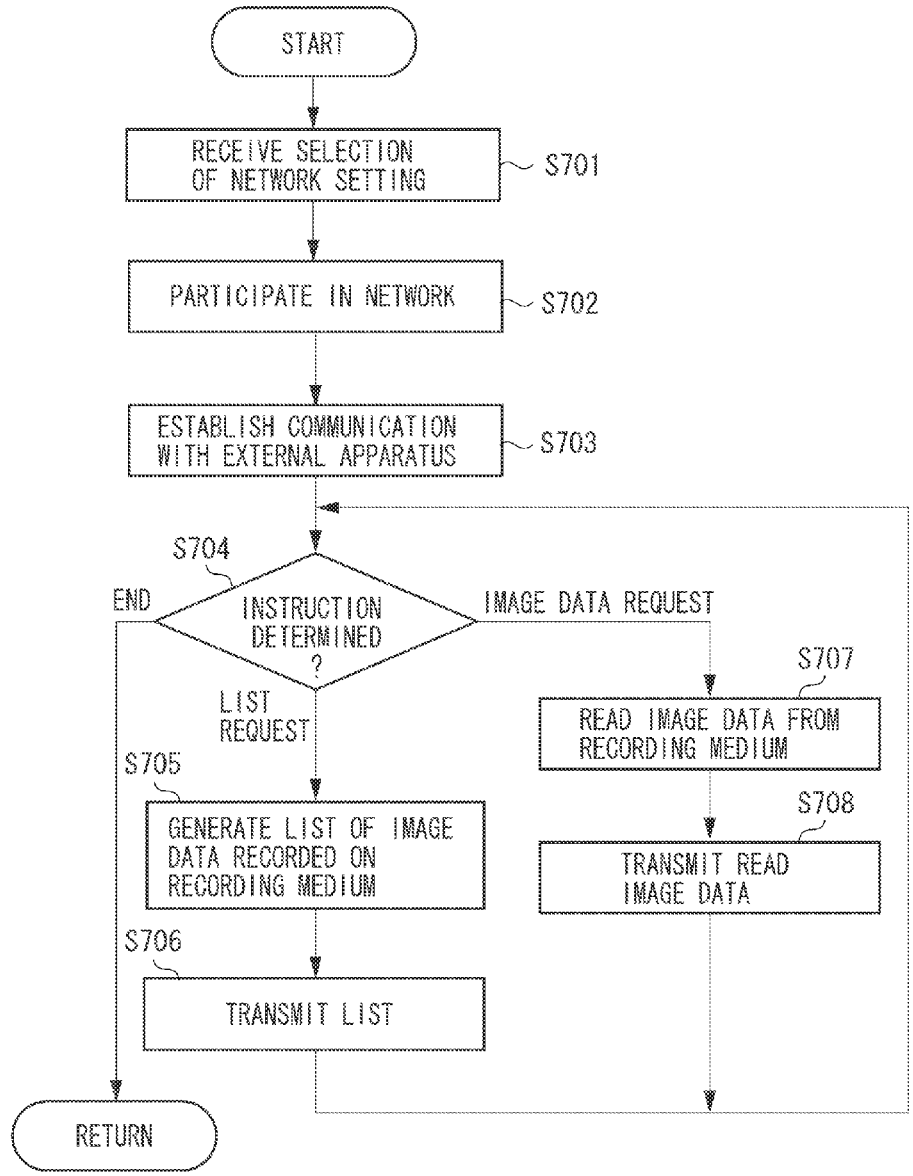
FIG. 7 is a flowchart illustrating an operation of the communication apparatus in server processing according to the first exemplary embodiment.

FIG. 7 is a flowchart of the server processing executed by the digital camera 100. The processing illustrated in the flowchart is executed in step S207 in FIG. 2.

First, in steps S701 through step S703, the processing similar to those in steps S601 through S603 in FIG. 6 is executed.

Figure 8:
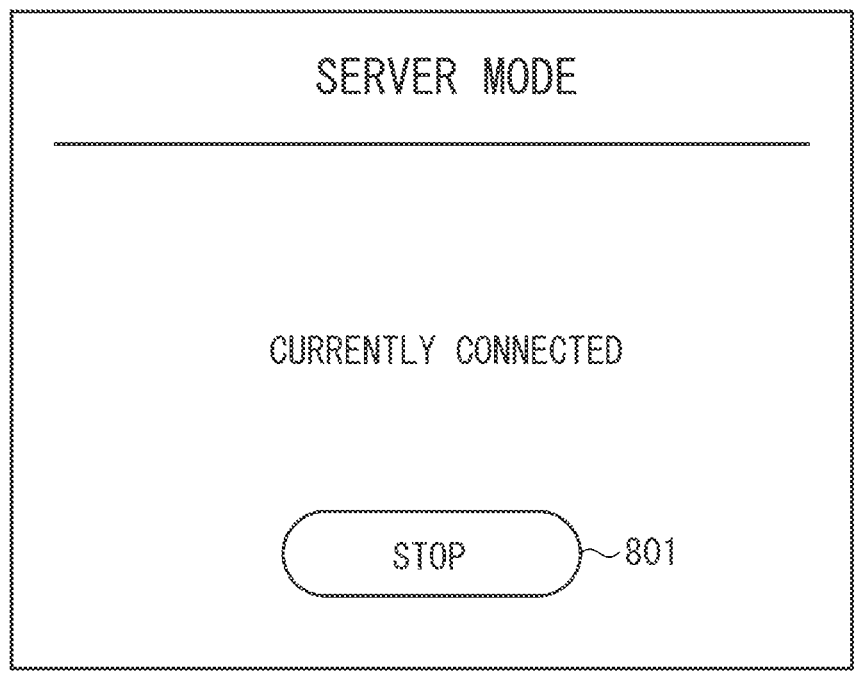
FIG. 8 illustrates an example of a display screen in the server processing according to the first exemplary embodiment.

Next, in step S704, the control unit 101 displays a screen such as illustrated in FIG. 8, and receives an instruction from the external apparatus to which connection has been established. On the screen in FIG. 8, a message "Currently connected" is displayed, which indicates communication with the external apparatus has been established. Further, on a lower part of the screen, a stop button 801 for exiting the processing in the present flowchart to return to the top menu screen in FIG. 3 is displayed. The user of the digital camera 100 can input an instruction to end the processing in the flowchart, by selecting the stop button 801, via the operation unit 105. There are two instructions received from the external apparatus as follows. One instruction is a request for a list of the image data recorded on the recording medium 110. The request of the list of the image data, when communication between the external apparatus and the digital camera 100 has been established, is transmitted from the external apparatus. Another instruction is a request for the image data recorded on the recording medium 110. The request for the image data is transmitted from the external apparatus according to the fact that the user of the external apparatus who has confirmed the list of the image data selects image data which the user wants to acquire. Hereinbelow, operations of the digital camera 100 when respective requests are received will be described.

First, in step S704, a case where the control unit 101 determines that a request for the list of the image data from the external apparatus has been received (LIST REQUEST in step S704) will be described. In that case, the processing proceeds to step S705.

In step S705, the control unit 101 generates a list of the image data recorded on the recording medium 110. The control unit 101 generates a list associated with information indicating, for example, names of the image data and recording areas of the image data.

Next, in step S706, the control unit 101 transmits the generated list to the external apparatus. When the processing for the step ends, the processing returns to step S704. Then, the control unit 101 waits for an instruction. On the other hand, the external apparatus receives the list transmitted in step S706, and lists and displays on the display unit the image data recorded on the recording medium 110 in the digital camera 100, based on the list. For example, as illustrated in FIG. 9, the external apparatus displays a list of names of the image data. Further, the external apparatus, in conjunction with the display in FIG. 9, receives an instruction of selection of the image data via the operation unit in the external apparatus. Accordingly, the user of the external apparatus can check the image data recorded on the recording medium 110 in the digital camera 100 and can select image data which the user wants to acquire from the digital camera 100. In response to reception of the instruction, the external apparatus transmits a request for the image data to the digital camera 100.

Next, in step S704, a case where the control unit 101 determines that the request for the image data has been received (IMAGE DATA REQUEST in step S704) will be described. In that case, the processing proceeds to step S707.

In step S707, the control unit 101 reads the requested image data from the recording medium 110 onto the work memory 104.

Then in step S708, the control unit 101 transmits the image data read in step S707 to the external apparatus. Thereafter, the processing returns to step S704. Through the processing in the step, the external apparatus can acquire the image data recorded on the recording medium 110 in the digital camera 100.

Further, the control unit 101, upon determining that the selection of the stop button 801 has been received (END in step S704), ends the processing in the present flowchart, and returns the processing to step S201 in FIG. 2.

The above operations are the server processing executed in step S207 in FIG. 2.

Hereinabove, the processing in which the digital camera 100 according to the present exemplary embodiment establishes communication with the external apparatus and performs exchange of data has been described.

In the above-described processing, in the client processing or the server processing, the control unit 101 reads the image data from the recording medium 110 and transmits it to the external apparatus. That is, the client processing or the server processing is processing which has the possibility of gaining access to the recording medium 110. Therefore, when the recording medium 110 is removed while the client processing or the server processing is in execution, there is a possibility that inconveniences such as communication errors may occur. Thus, in the digital camera 100 according to the present exemplary embodiment, if the control unit 101 detects that the cover 111 is in the opened state while the client processing or the server processing is in execution, communication with the external apparatus is ended. On the other hand, in the setting processing, the network settings or the setting of connection destination are recorded on the nonvolatile memory 103. That is, the setting processing is processing in which there is no need to gain access to the recording medium 110. In other words, even if the recording medium 110 is removed while the setting processing is in execution, it would appear that inconveniences are not likely to occur. Thus, in the digital camera 100 according to the present exemplary embodiment, even if it is detected that the cover 111 is in the opened state while the setting processing is in execution, communication with the external apparatus is not ended. The processing executed by the digital camera 100 to realize such an operation will be described below.

Figure 10:
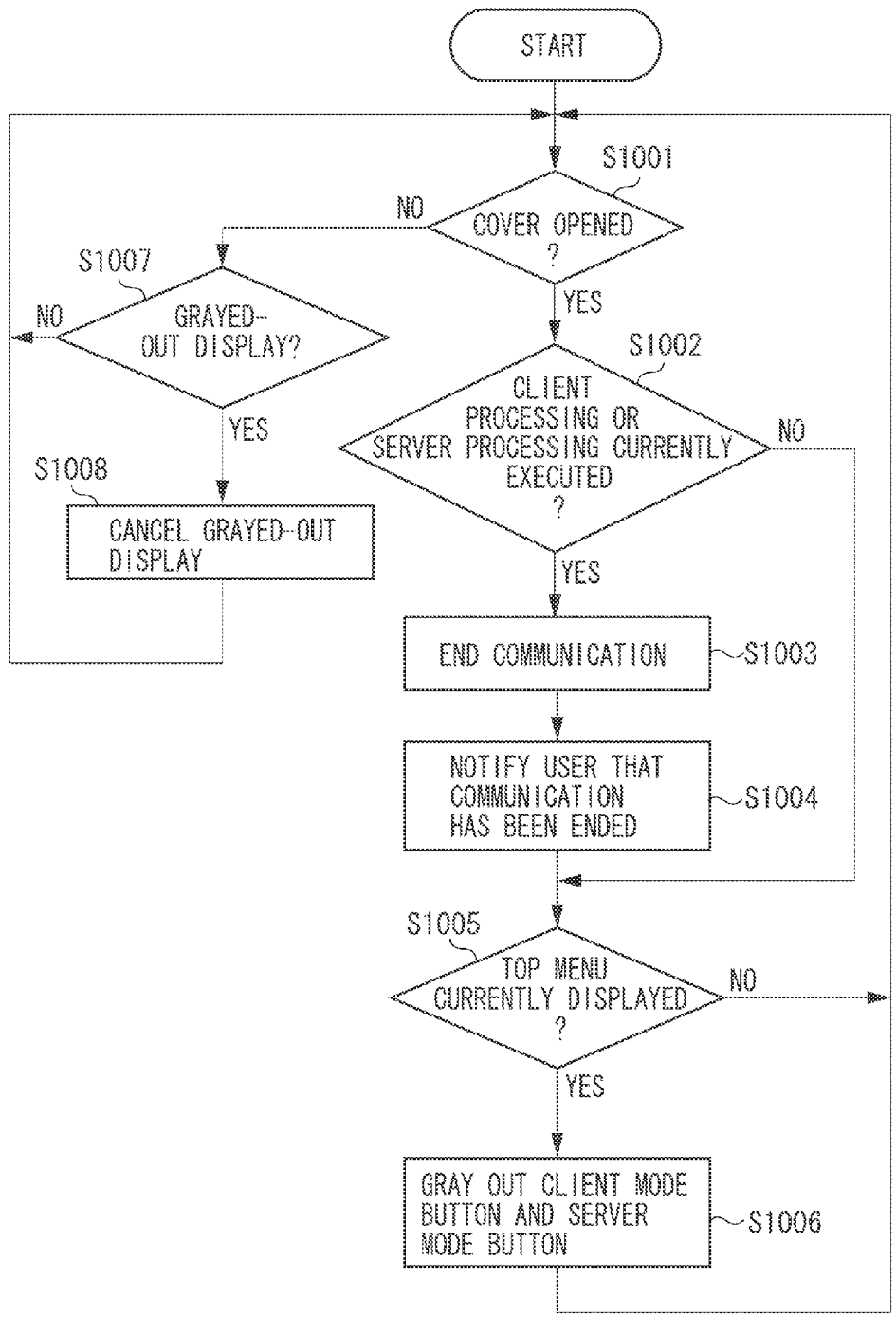
FIG. 10 is a flowchart illustrating an operation of the communication apparatus in processing for checking opening and closing of a cover according to the first exemplary embodiment.

FIG. 10 is a flowchart illustrating the processing for checking whether the cover 111, which covers the recording medium 110, is opened. The processing illustrated in the flowchart is executed in parallel with the above-described processing in FIG. 2, FIG. 4, FIG. 6, and FIG. 7.

First, in step S1001, the control unit 101 determines whether the cover 111 is in the opened state. Specifically, the control unit 101 determines opening and closing of the cover 111 by detecting the ON/OFF position of a switch provided on the cover 111. The control unit 101, if it is determined that the switch is in the ON position, determines that the cover 111 is in the opened state, and thus the recording medium 110 is in the attachable and detachable state. Conversely, the control unit 101, if it is determined that the switch is in the OFF position, determines that the cover 111 is in the closed state, and thus the recording medium 110 is in an unattachable and undetachable state.

First, a case where the control unit 101 determines that the cover 111 is opened (YES in step S1001) will be described. In that case, the processing proceeds to step S1002.

In step S1002, the control unit 101 determines whether the client processing (in step S205 in FIG. 2) or the server processing (in step S207 in FIG. 2) is currently executed in parallel. In other words, the control unit 101 determines whether the current mode is in the client mode or the server mode. The control unit 101, if it is determined that the client processing or the server processing is not currently executed (NO in step S1002), does not end the communication, and the processing proceeds to step S1005. As described above, for example in the setting processing, the connection destination setting or the network settings is recorded on the unremovable nonvolatile memory 103, instead of the removable recording medium 110. That is, while the setting processing (processing in step S204 in FIG. 2) is in execution, there is no need to gain access to the recording medium 110. Regarding the processing in steps S201 through step S203, S206, and S208 in FIG. 2, similarly there is no need to gain access to the recording medium 110. Therefore, the processing to be executed in parallel without ending the communication is continued. On the other hand, in the client processing in step S205 or the server processing in step S207, processing for reading the image data from the recording medium 110 is included. That is, it is necessary to gain access to the recording medium 110. Therefore, if the control unit 101 determines that the client processing or the server processing is currently executed (YES in step S1002), the processing proceeds to step S1003, and the control unit 101 ends the communication.

In step S1003, the control unit 101 ends the processing executed in parallel, and ends the communication. In this step, the control unit 101 ends the processing, regardless of whether the processing that is currently executed in parallel is, for example, the processing for receiving selection of a network to participate in (e.g., step S601 in FIG. 6) or the processing for reading the image data from the recording medium 110 (e.g., step S604 in FIG. 6). In the client processing or the server processing, in order to achieve transmission of the image data to the external apparatus which is an object of their processing, the processing for reading the image data from the recording medium 110, that is, execution of the processing for gaining access to the recording medium 110 is necessary. Therefore, in the client processing or the server processing, even when the control unit 101 is not accessing the recording medium 110 at the time the cover 111 is opened, the control unit 101 will need to gain access to the recording medium 110 at any point in time. If the cover 111 remains opened, the control unit 101 is going to end the communication. In that case, the processing in step S604 or step S704 and earlier will become useless. Thus, in the digital camera 100 according to the present exemplary embodiment, when the client processing or the server processing is in execution, the control unit 101 ends the processing even when the control unit 101 is not accessing the recording medium 110 at the time point the cover 111 is opened.

Figure 11A:
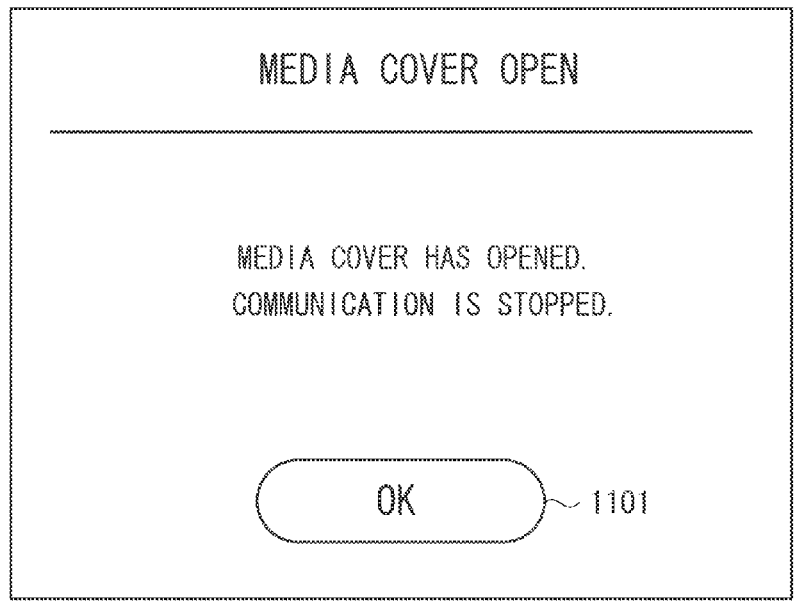
FIGS. 11A and 11B illustrate examples of a display screen in processing for checking opening and closing of the cover according to the first exemplary embodiment.

Next, in step S1004, the control unit 101 notifies the user that the communication has been ended. The control unit 101 notifies the user, for example, by displaying a screen such as illustrated in FIG. 11A on the display unit 106. Further, display of the OK button 1101 prompts the user to check. The user can select the OK button 1101 via the operation unit 105. Upon receiving the selection of the OK button 1101, the control unit 101 ends display of the screen in FIG. 11A, and returns the processing to original processing. Since, in step S1003, the client processing or the server processing has been ended, the processing returns to step S201 in FIG. 2, and the screen of the top menu in FIG. 3 is displayed.

Then, in step S1005, the control unit 101 determines whether the top menu in FIG. 3 is currently displayed. If it is determined that the processing executed in parallel in step S1002 is the client processing or the server processing, the top menu in FIG. 3 is displayed at that time point. On the other hand, if it is determined that the processing currently executed in parallel is not the client processing or the server processing in step S1002, the top menu in FIG. 3 is not displayed, if the setting processing is in progress. Further, if the processing in step S201 or in step S202 is currently executed, the top menu in FIG. 3 is currently displayed.

Figure 11B:
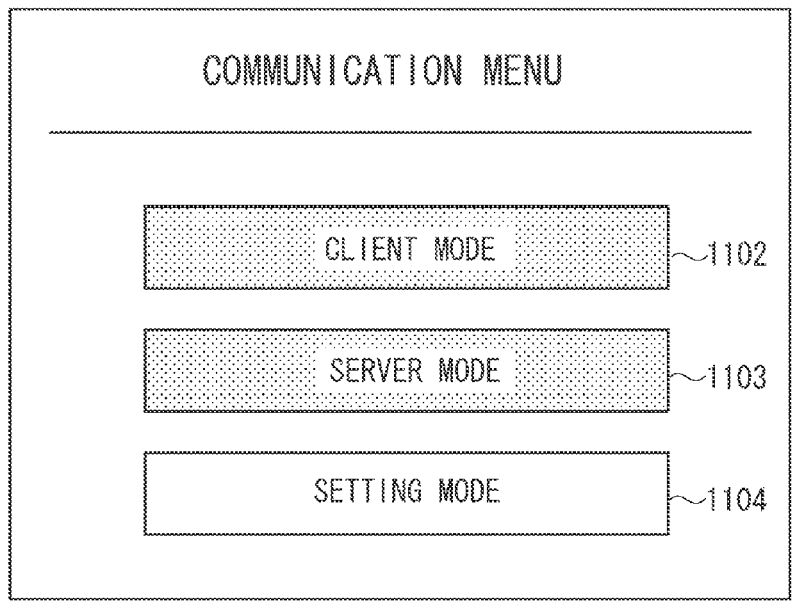

In step S1005, if the control unit 101 determines that the top menu is not currently displayed (NO in step S1005), the processing returns to step S1001, and the control unit 101 continues to monitor the cover 111. On the other hand, if the control unit 101 determines that the top menu is currently displayed (YES in step S1005), the client mode button and the server mode button on the top menu screen are displayed in an unselectable manner. For example, as illustrated in FIG. 11B, a client mode button 1102 and a server mode button 1103 are grayed out. In this process, the control unit 101 does not receive an instruction to select a grayed-out button. Accordingly, as long as it is determined that the cover 111 is in the opened state, the control unit 101 controls not to execute the processing which has a possibility of gaining access to the recording medium 110. Since the setting processing is processing which does not need to gain access to the recording medium 110, a setting mode button 1104 is not grayed out. That is, the setting mode button 1104 is displayed to be selectable, so that an instruction to select the mode can be received.

The above operations are the processing in a case where the control unit 101 determines that the cover 111 is opened in step S1001.

Next, in step S1001, the processing in a case where the control unit 101 determines that the cover 111 is closed (NO in step S1001) will be described. In that case, the processing proceeds to step S1007.

In step S1007, the control unit 101 determines whether the client mode button and the server mode button on the top menu screen are displayed in an unselectable manner. In other words, the control unit 101 determines whether the client mode button and the server mode button on the top menu screen are displayed grayed out. If the control unit 101 determines that the client mode button and the server mode button on the top menu screen are not displayed grayed out (NO in step S1007), the processing returns to step S1001. Then, the control unit 101 continues to monitor the cover 111.

On the other hand, if the control unit 101 determines that the client mode button and the server mode button on the top menu screen are displayed grayed out (YES in step S1007), the processing proceeds to step S1008. In step S1008, the control unit 101 cancels the grayed-out client mode button and server mode button. That is, the client mode button and the server mode button on the top menu screen are redisplayed in a selectable manner. Accordingly, the buttons which have been displayed grayed out in step S1006 become selectable again, by closing the cover 111. Thereafter, the processing returns to step S1001 and the control unit 101 continues to monitor the cover 111.

The above operations are the processing for checking whether the cover 111, which covers the recording medium 110, is opened.

As described above, in the present exemplary embodiment, checking processing is performed in parallel with the processing relating to the communication. In the checking processing, switching between ending and continuing the communication is performed depending on a mode of the digital camera 100 when the opened state of the cover 111 is detected. That is, the communication is continued, if it is determined that the processing that is currently executed in parallel is a mode that does not need to gain access to the recording medium 110, even when the recording medium 110 has come into the attachable and detachable state. Accordingly, a possibility of ending the communication at a useless timing can be reduced.

Further, in the above-described exemplary embodiment, it is determined whether to end communication depending on whether the client processing or the server processing is in execution. In addition to this, it may be determined whether to end communication according to a communication protocol used for each processing. As the protocol when exchange of data with the external apparatus is performed, an FTP, and a hyper text transfer protocol (HTTP), for example, are known. Generally, in the FTP, connection for data transfer and connection for control can be individually established, and as a result, smaller error notification or more flexible interrupt processing than the HTTP in which data is exchanged in one connection can be performed. Therefore, in a case where the FTP protocol is used, there is a possibility that the processing and the functions of the present exemplary embodiment may overlap. Thus, in step S1002 in FIG. 10, in addition to determination whether the client processing or the server processing is in execution, it is determined whether the communication protocol to be used is the FTP. In that case, it is configured to end the communication according to the fact that it is determined that the communication protocol to be used is not the FTP. That is, if it is determined that the communication protocol to be used is the FTP, even when the client processing or the server processing is in execution, the communication is continued. Regarding a case where the recording medium 110 is removed, the function of the FTP can deal with possible errors.

In the above-described exemplary embodiment, an example of ending the communication as the cover 111 is opened has been described. Instead of ending the communication, it may be configured to temporarily stop the communication. If it is thus configured, the communication is resumed according to the fact that the cover 111 is closed.

Further, in the above-described exemplary embodiment, an example of transmitting the image data to the external apparatus has been described. It may be configured such that not only the image data but also various content data can be transmitted. For example, it may be configured such that music data or text data can be transmitted.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-286777 filed Dec. 27, 2011, which is hereby incorporated by reference herein in its entirety.

What is claimed is:

1. A communication apparatus configured to communicate with an external apparatus, the communication apparatus comprising:
    a recording unit configured to record content data on a removable recording medium;
    a transmission unit configured to transmit the content data to the external apparatus;
    a selection unit configured to select a mode from among a plurality of modes including a setting mode for acquiring information necessary for transmitting the content data to the external apparatus by communicating with the external apparatus, and storing the information on an unremovable recording medium other than the removable recording medium, and a transmission mode for communicating with the external apparatus using the information stored in the setting mode, and transmitting content data read from the removable recording medium to the external apparatus;
    a determination unit configured to determine whether the removable recording medium is in a detachable state; and
    a control unit configured to control communication with the external apparatus,
    wherein, in a case where the selected mode is the transmission mode when it is determined by the determination unit that the removable recording medium is in the detachable state, the control unit stops communication with the external apparatus, and
    in a case where the selected mode is the setting mode when it is determined by the determination unit that the removable recording medium is in the detachable state, the control unit does not stop communication with the external apparatus.

2. The communication apparatus according to claim 1, wherein the setting mode starts in response to the setting mode being selected by the selection unit, and ends in response to completion of storage of the information necessary for transmitting the content data to the external apparatus on the unremovable recording medium.

3. The communication apparatus according to claim 1, wherein the setting mode ends in response to completion of setting of a network for communicating with the external apparatus.

4. The communication apparatus according to claim 1, wherein the transmission mode includes a client mode for communicating with the external apparatus using the information stored in the setting mode according to an instruction received from a user, and transmitting content data read from the removable recording medium to the external apparatus, and
    wherein, in a case where the selected mode is the client mode when it is determined by the determination unit that the removable recording medium is in the detachable state, the control unit stops communication with the external apparatus.

5. The communication apparatus according to claim 1, further comprising:
    a receiving unit configured to receive an instruction from the external apparatus,
    wherein the transmission mode includes a server mode for communicating with the external apparatus using the information stored in the setting mode, and transmitting to the external apparatus content data read from the removable recording medium according to an instruction from the external apparatus, and
    wherein, in a case where the selected mode is the server mode when it is determined by the determination unit that the removable recording medium is in the detachable state, the control unit stops communication with the external apparatus.

6. The communication apparatus according to claim 1, wherein during a period when it is determined by the determination unit that the removable recording medium is in the detachable state, the selection unit does not select the transmission mode.

7. The communication apparatus according to claim 1, further comprising a notification unit configured to notify, during a period when it is determined by the determination unit that the removable recording medium is in the detachable state, a user that selection of the transmission mode by the selection unit is disabled.

8. The communication apparatus according to claim 1, wherein, in a case where it is determined by the determination unit that the removable recording medium is in an undetachable state after the control unit stops communication with the external apparatus, the control unit resumes communication with the external apparatus, which has been stopped.

9. The communication apparatus according to claim 1, wherein, in a case where a communication protocol to be used for communicating with the external apparatus is a file transfer protocol (FTP) even when the selected mode is the transmission mode, the control unit controls communication with the external apparatus according to a function of the file transfer protocol (FTP).

10. The communication apparatus according to claim 1, further comprising an openable and closable cover member configured to cover the removable recording medium,
    wherein the determination unit determines whether the removable recording medium is in the detachable state based on an opened or closed state of the cover member.

11. A method for controlling a communication apparatus configured to communicate with an external apparatus, the method comprising:
    recording content data on a removable recording medium;
    performing setting processing for acquiring information necessary for transmitting the content data to the external apparatus by communicating with the external apparatus, and storing the information on an unremovable recording medium other than the removable recording medium; and communicating with the external apparatus using the stored information, and transmitting content data read from the removable recording medium to the external apparatus;

stopping, when the removable recording medium comes into a detachable state during transmission of the content data, communication with the external apparatus; and not stopping, when the removable recording medium comes into the detachable state during execution of the setting processing, communication with the external apparatus.

12. A non-transitory computer-readable storage medium storing a program that causes a computer to perform the method according to claim 11.

13. A communication apparatus configured to communicate with an external apparatus, the communication apparatus comprising:

a recording unit configured to record content data on a removable recording medium;

a transmission unit configured to transmit the content data to the external apparatus;

a selection unit configured to select a mode from among a plurality of modes including a first mode and a second mode, wherein in the first mode, data is read from the removable recording medium, and in the second mode, data is recorded on a different area from the removable recording medium;

a determination unit configured to determine whether the removable recording medium is in a detachable state; and a control unit configured to control communication with the external apparatus, wherein, in a case where the selected mode is the first mode and the determination unit determines that the removable recording medium is in the detachable state, the control unit stops communication with the external apparatus, and in a case where the selected mode is the second mode and the determination unit determines that the removable recording medium is in the detachable state, the control unit does not stop communication with the external apparatus.

14. A communication apparatus configured to communicate with an external apparatus, the communication apparatus comprising:

a recording unit configured to record content data on a removable recording medium;

a transmission unit configured to transmit the content data to the external apparatus;

a selection unit configured to select a mode from among a plurality of modes including a first mode and a second mode, in the first mode, the removable recording medium is accessed, and in the second mode, the removable recording medium is not accessed;

a determination unit configured to determine whether the removable recording medium is in a detachable state; and a control unit configured to control communication with the external apparatus, wherein, in a case where the selected mode is the first mode and the determination unit determines that the removable recording medium is in the detachable state, the control unit stops communication with the external apparatus, and in a case where the selected mode is the second mode and the determination unit determines that the removable recording medium is in the detachable state, the control unit does not stop communication with the external apparatus.

15. The communication apparatus according to claim 13, wherein in the second mode, data is not recorded on the removable recoding medium.

16. The communication apparatus according to claim 13, wherein in the second mode, data is not recorded on the removable recoding medium and data is not read from the removable recording medium.

17. The communication apparatus according to claim 13, further comprising an openable and closable cover member configured to cover the removable recording medium, wherein the determination unit determines whether the removable recording medium is in the detachable state based on an opened or closed state of the cover member.

18. The communication apparatus according to claim 17, wherein the determination unit determines that the removable recording medium is in the detachable state in a case that the state of the cover member is opened, and the determination unit determines that the removable recording medium is in an undetachable state in a case that the state of the cover member is closed.

* * * * *